Patented July 8, 1924.

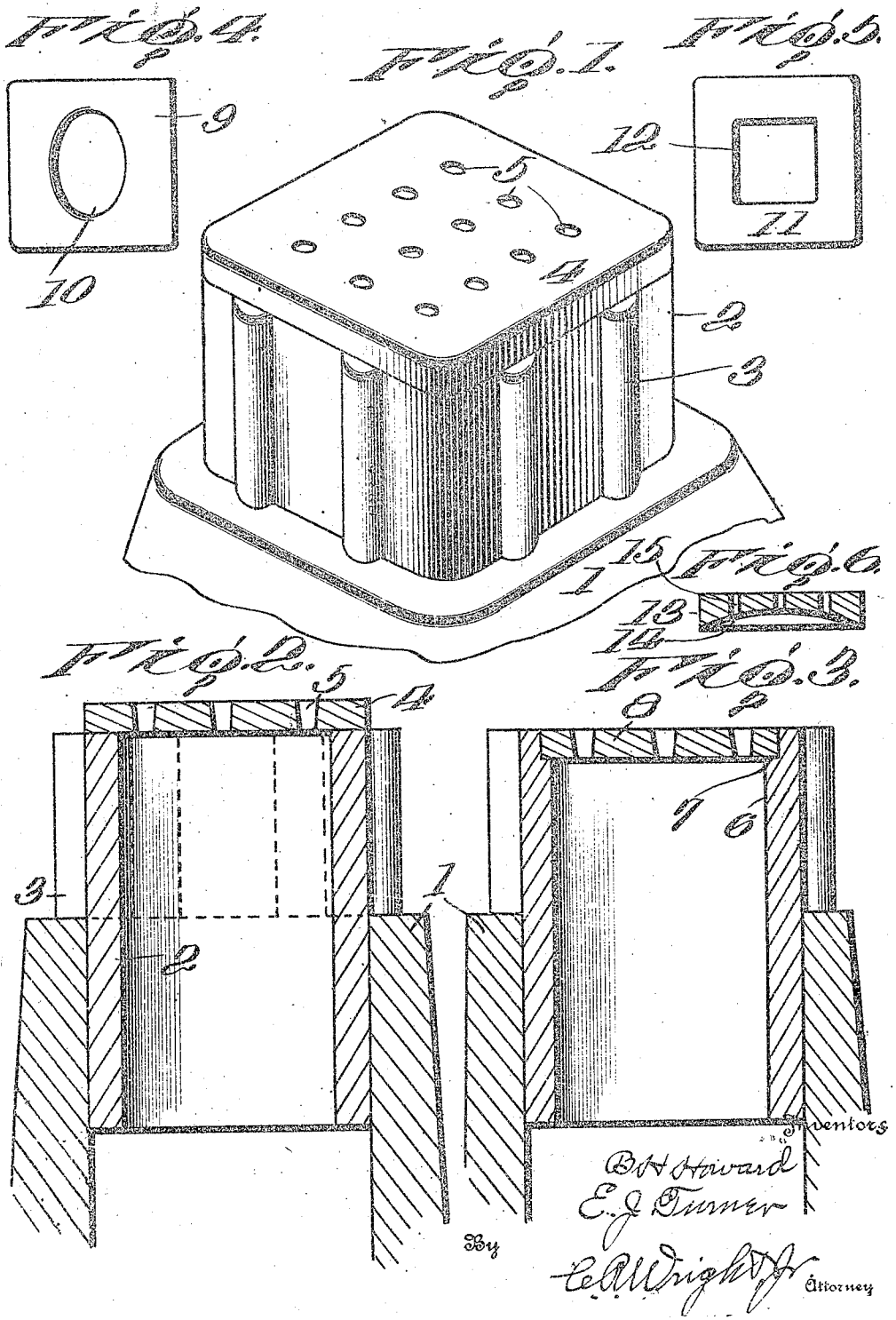

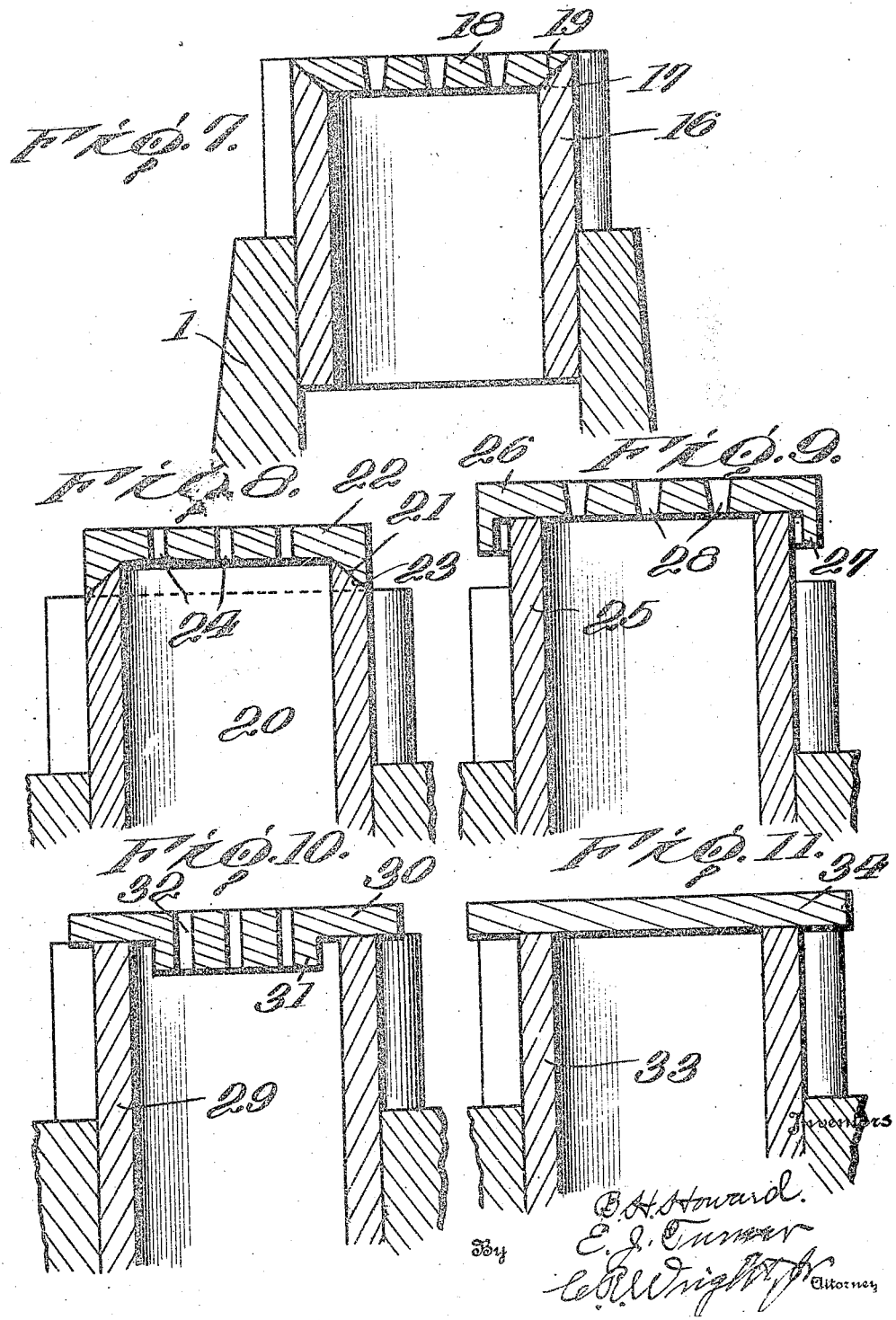

1,500,761

UNITED STATES PATENT OFFICE.

BLOOMFIELD H. HOWARD, OF WASHINGTON, DISTRICT OF COLUMBIA, AND ERNEST J. TURNER, OF PITTSBURGH, PENNSYLVANIA.

COVER FOR FEEDERS FOR INGOT MOLDS.

Application filed April 24, 1924. Serial No. 708,683.

*To all whom it may concern:*

Be it known that BLOOMFIELD H. HOWARD and ERNEST J. TURNER, citizens of the United States, residing, respectively, at Washington, District of Columbia, and Pittsburgh, in the county of Allegheny and State of Pennsylvania, have invented certain new and useful Improvements in Covers for Feeders for Ingot Molds, of which the following is a specification.

Our invention relates to improvements in covers for feeders for ingot molds.

The object of our invention is to provide a cover for feeders adapted to rest upon the upper end of the feeder and to retain the heat in the feeder and yet allow the passage of the gases from the feeder, whereby the heat is retained in the upper end of the mold to prevent the formation of what is known as "piping" and reduce "segregation."

Another object of our invention is to provide a cover of this character which can be readily applied to any feeder and which will be properly retained on the upper end of the feeder during the cooling process.

A further object of our invention is to provide a simple cheap and effective cover of this character having certain details of structure and combination of parts hereinafter more fully set forth.

In the accompanying drawings:—

Figure 1 is a perspective view of an ingot mold showing a feeder thereon having our improved cover applied thereto.

Figure 2 is a vertical transverse sectional view of Figure 1.

Figure 3 is a vertical transverse sectional view similar to Figure 2 showing a modified form of cover.

Figure 4 is a plan view of cover showing a single opening thereto.

Figure 5 is a view similar to Figure 4 showing a single rectangular opening therein.

Figure 6 is a transverse sectional view of the cover showing a slightly modified form.

Figure 7 is a vertical transverse sectional view showing a modified form of interlocking between the upper end of the feeder and the cover.

Figure 8 is a vertical sectional view similar to Figure 7 showing another modified form of means for retaining the cover on the feeder.

Figure 9 is a vertical sectional view similar to Figures 7 and 8 showing a still further modified form of cover.

Figure 10 is a vertical sectional view showing another modified form of cover.

Figure 11 is a view similar to Figures 9 and 10 showing a flat cover without any openings for the escape of gases.

Referring now to the drawings 1 represents the mold and 2 the feeder. The feeder is supported in the mold by the ribs 3 all of which is readily understood by those skilled in the art and needs no further description.

As shown in Figures 1 and 2 of the drawings, the upper end of the feeder is perfectly flat and our improved cover comprises a plate 4 preferably of refractory material and of a thickness approximately the same as that of the walls of the feeder. The plate 4 is of a size so as to completely close the bore of the feeder and rest upon the upper flat edges of the feeder and is provided with a series of openings 5 to allow the escape of gases and yet to retain the heat which would otherwise pass off to the atmosphere.

In Figure 3 the upper end of the feeder 6 is cut away as indicated at 7 forming an annular flange on the inner wall and the cover 8 is of a size to fit within the feeder and rest upon the flange. By this structure it will be seen that the cover is held within the feeder and could not possibly move out of position before the ingot is thoroughly cooled.

In Figure 4 the cover 9 is provided with a single oval opening 10 to allow the escape of the gases.

Figure 5 shows the cover 11 provided with a square opening 12 to allow the escape of gasses.

In Figure 6 the cover 13 has its lower face concave as indicated at 14 and provided with a series of openings 15 which allow a more ready escape of the gases from the feeder and yet retain the greater portion of the heat.

In Figure 7 of the drawings the upper end of the feeder 16 is beveled as indicated at 17 and the cover 18 is provided with correspondingly beveled edges 19 whereby the cover tightly fits within the upper end of the feeder and is prevented from moving on the feeder.

Figure 8 shows the upper end of the feeder 20 beveled in the opposite direction from that shown in Figure 7 as indicated at 21 and the cover 22 is provided around its outer edges with the downwardly beveled flange 23 which engages the beveled wall 21 of the feeder and locks the cover on the feeder against lateral movement. This cover is provided with openings 24 to allow the escape of gases from the feeder.

In Figure 9 the feeder 25 has its upper end perfectly flat like that shown in Figures 1 and 2 of the drawings and the cover 26 is provided on its outer edges with the downwardly extending flanges 27 which extend down along the outer face of the feeder 25 and prevent the cover from sliding off of the feeder. This cover is provided with a series of tapering openings 28 to allow the escape of the gases from the feeder.

Figure 10 shows the feeder 29 constructed exactly like that shown in Figures 1, 2, 9 and 10 and the cover 30 at the center is provided with a thickened portion 31 which extends into the bore of the feeder and which engages the inner wall of the feeder, thus preventing the cover from sliding off of the feeder. This construction also provides a greater amount of refractory material and would retain the heat more effectively. In this form, the feeder is provided with a series of openings 32.

In the form shown in Figure 11 the feeder 33 is made precisely like that shown in Figures 1, 2, 9 and 10 and the cover 34 is made like that shown in Figures 1 and 2 of the drawings except the same is not provided with openings. In this form the cover completely closes the upper end of the feeder, but owing to slight imperfections in the upper end of the feeder and also in the lower face of the cover, sufficient space would be provided for the escape of gases. If this is not true the gases will lift the cover slightly and escape, and the cover would again seat itself upon the feeder.

While we have shown and described this specific structure it will be understood that what we claim is a broad idea of closing the upper end of the feeder by a cover of refractory material.

Having thus fully described our invention what we claim is:—

1. A cover for feeders for ingot molds comprising a body portion of refractory material adapted to rest upon the upper end of the mold and having means for preventing lateral movement thereon.

2. A cover for feeders for ingot molds comprising a body portion made of refractory material resting upon the upper end of the mold and having means for preventing lateral movement on the feeder and having means for allowing the gas to escape from the feeder.

3. A cover for feeders for ingot molds comprising a body portion adapted to rest upon the upper end of the feeder and interlocking therewith to prevent lateral movement thereon and having means to allow the gas to escape from the feeder.

4. A cover for feeders for ingot molds comprising a body portion made of refractory material and having means for preventing lateral movement thereof on the feeder and having means to allow the escape of gas from the feeder.

5. A cover for feeders for ingot molds comprising a body portion adapted to close the upper end of the feeder and having means for allowing the escape of the gases from the feeder.

6. A cover for feeders for ingot molds comprising a body portion of refractory material adapted to rest upon the upper end of the feeder and having means to allow the escape of gases from the feeder.

7. The combination with a hot top feeder of a cover constructed and arranged to be supported on the upper end of the feeder and close the same.

8. The combination with a feeder for ingot molds of a cover adapted to be supported on the upper end of the feeder and close the same and hold against lateral displacement.

9. The combination with a feeder for ingot molds of a cover adapted to be supported by the upper end of the feeder and having means for allowing the escape of gases from the feeder.

10. The combination with a feeder for ingot molds of a cover adapted to be supported on the upper end of the mold and having means for allowing the escape of gases from the feeder and means for preventing the cover from moving laterally from the feeder.

In testimony whereof we affix our signatures.

BLOOMFIELD H. HOWARD.
ERNEST J. TURNER.